Aug. 21, 1928.
S. RICKLES
1,681,786
COFFEE SACK HOLDER
Filed May 26, 1925
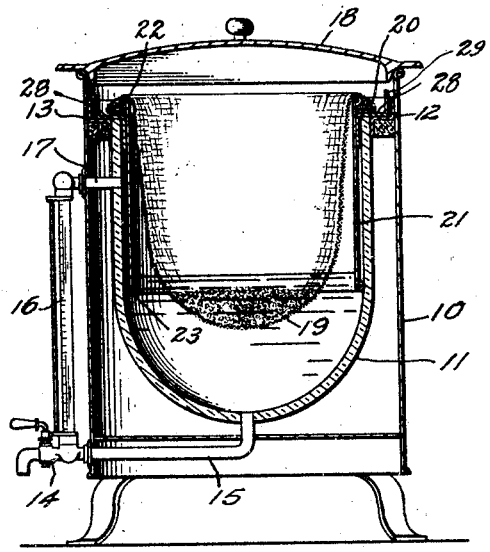
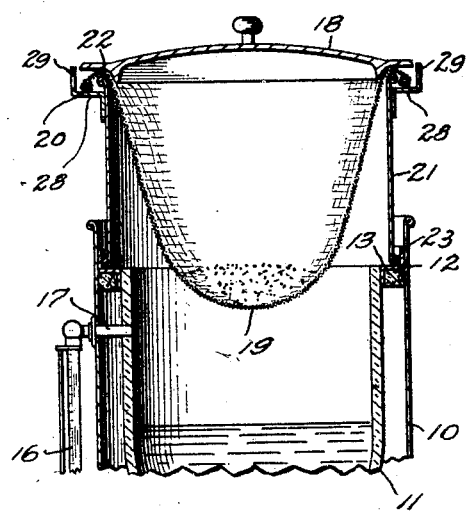
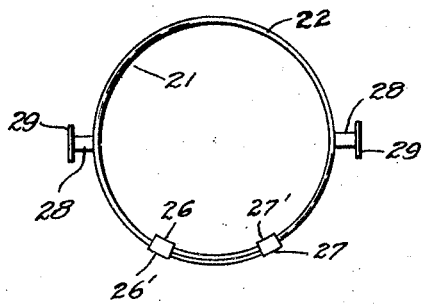
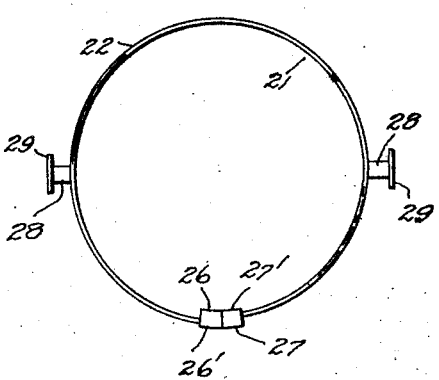
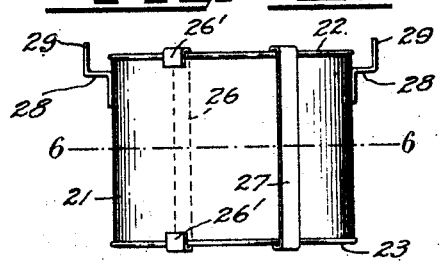
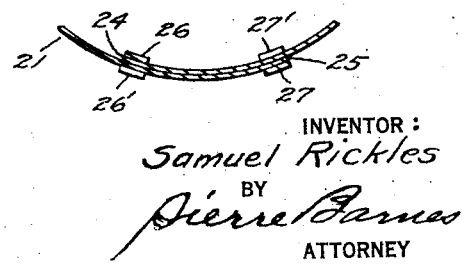
INVENTOR:
Samuel Rickles
BY
Pierre Barnes
ATTORNEY Patented Aug. 21, 1928.

1,681,786

UNITED STATES PATENT OFFICE.

SAMUEL RICKLES, OF SEATTLE, WASHINGTON.

COFFEE-SACK HOLDER.

Application filed May 26, 1925. Serial No. 32,884.

This invention relates to coffee making apparatus and more especially to a sack supporting device for use in coffee urns.

The object of the invention is the provision of a device of this character which is adapted to retain the coffee sack at different elevations, and cooperate with the cover of a coffee urn to prevent the escape of steam or vapors from the beverage.

More specific objects and advantages of the invention will appear in the following specification.

The invention consists in the novel construction and adaptation of parts hereinafter described, illustrated and claimed.

In the accompanying drawing,—

Figure 1 is a vertical section of a coffee urn and a sack-supporter embodying my invention as applied in one stage of coffee beverage making. Fig. 2 is a similar view of the upper portion of the urn with the supporter disposed in its sack draining position. Fig. 3 is a plan view of the sack supporter as it appears in the contracted form in which it is illustrated in Fig. 1. Fig. 4 is a view similar to Fig. 3 of the sack supported in its expanded Fig. 2 position. Fig. 5 is an elevational view of the supporter shown separately, and Fig. 6 is a detail sectional view on line 6—6 of Fig. 5.

In said drawing, the reference numeral 10 represents the casing of a coffee urn containing a crock element 11 in which the beverage is made. The crock 11 is of less diameter than the casing to afford space therebetween for hot water.

As shown said crock is secured to the casing at a proper elevation by means of a metal ring 12 which furnishes a ledge 13 located below the upper edge of the casing.

14 represents a draw-off faucet connected by a pipe 15 with the bottom of the crock, said pipe also serving as the bottom connection with a liquid-level glass 16 whose upper end is connected to the crock by means of a pipe 17.

18 represents a cover for the open top of the casing. 19 is a fabric sack for containing ground coffee such as used in making the beverage. 20 represents a wire ring secured to the sack about its mouth for distending the same, said ring also being of a diameter to seat upon the ledge 13 as hitherto for suspending the sack therefrom.

The parts above referred to are or may be of known or suitable construction.

According to the present invention, I provide a tubular sack supporter (Fig. 5) formed from a sheet of metal to a tubular shape with a circular wall 21 having its upper and lower edges 22 and 23 rolled preferably about reinforcing wires.

The wall ends 24 and 25 (Fig. 6) over-lap one another circumferentially of the tube and, as shown, are reinforced at its ends by vertically disposed cleats 26 and 27.

The cleat 26 for the wall end 24 is secured to the inner surface of the wall; the cleat ends $26^1$ being bent to afford guideways for the opposite end portion of the wall. The cleat 27 for the wall end 25 is secured to the outer surface of the wall and has its ends as $27^1$ bent to afford guideways for the opposite end portion of the wall.

When the tube is in its most expanded position, shown in Figs. 2 and 4, the cleats 26 and 27 are in juxtaposed relation with each other to afford a substantially steam tight joint between the wall ends.

Secured to the tubular wall 21 at diametrically opposite sides, or nearly so, and extending radially of the tube axis are brackets 28 having upturned outer ends 29 which constitute handles for conveniently regulating and carrying the device.

The tubular device or tube, as it will be hereinafter designated, suspends the sack 19 interiorly thereof by having the upper portion of the sack extend over the top edge of the tube, the sack ring 20 being supported upon the brackets 28.

Thus arranged, ground coffee is deposited in the sack and the latter together with the tube are inserted within the crock 11, as shown in Fig. 1 to cause the coffee being submerged in the liquid within the crock.

To enter the tube in the crock, it must be contracted as shown in Figs. 1 and 2. When inserted in the crock the tube is supported by means of its brackets 28 seating upon the urn ledge 13. After the coffee has been immersed in the hot water for a suitable time the sack containing the coffee is then withdrawn from the water and retained by means of the tube in its elevated or draining position. For which purpose the tube is expanded and seated upon the ledge 13, as shown in Fig. 2.

The cover 18 is employed directly upon the urn when the tube is in its lowermost position shown in Fig. 1 and employed upon the tube when the latter is in its elevated Fig. 2 position, in either case the cover acts to prevent the escape of vapors from the beverage.

What I claim, is,—

1. The combination with a coffee urn comprising an outer casing, a crock secured therein with its upper edge disposed to afford a ledge below the upper edge of said casing, and a porous sack, of a support for said sack, said support consisting of a tube adjustable diametrically to enter the crock and also to seat upon said ledge, and means protruding from the tube to engage upon said ledge for suspending the tube when the latter extends into the crock.

2. The combination with a coffee urn comprising an outer casing, a crock secured therein with its upper edge disposed to afford a ledge below the upper edge of said casing, and a porous sack, of a support for said sack, said support consisting of a tube adjustable diametrically to enter the crock and also to seat upon said ledge, means protruding from the tube to engage upon said ledge for suspending the tube when the latter extends into the crock, and a cover adapted to seat upon the urn casing and the tube respectively when the latter extends into the crock and when the tube is seated upon the ledge.

3. A sack supporting device for a coffee urn comprising an expansible cylindrical tube formed of sheet metal with over-lapping ends and brackets protruding from opposite sides of the tube, said tube when expanded being adapted to seat upon the urn for supporting the device at one elevation, and when contracted to present said brackets in engageable relation with the urn for supporting the device at a lower elevation.

4. A sack supporter for coffee urns comprising a cylindrical tube formed of sheet metal with overlapping ends, means connected to said ends for guiding the same circumferentially of the tube when adjusting the latter to different diameters, and bracket attachments protruding from opposite sides of the tube, said attachments being located a short distance below the upper end of the tube, and adapted to be used interchangeably with the bottom edge of the supporter for retaining the sack at different elevations, selectively.

Signed at Seattle, Washington, this 9th day of May, 1925.

SAMUEL RICKLES.